(12) United States Patent
Mori et al.

(10) Patent No.: US 8,550,622 B2
(45) Date of Patent: Oct. 8, 2013

(54) PROGRESSIVE POWER LENS AND PROGRESSIVE POWER LENS DESIGN METHOD

(75) Inventors: Takateru Mori, Minowa-machi (JP); Kazutoshi Kato, Minamiminova-mura (JP); Ayumu Ito, Minowa-machi (JP)

(73) Assignee: Hoya Lens Manufacturing Philippines Inc., Cavite (PH)

( * ) Notice: Subject to any disclaimer, the term of this patent is extended or adjusted under 35 U.S.C. 154(b) by 94 days.

(21) Appl. No.: 13/290,936

(22) Filed: Nov. 7, 2011

(65) Prior Publication Data

US 2012/0113387 A1    May 10, 2012

(30) Foreign Application Priority Data

Nov. 8, 2010   (JP) ................................. 2010-249450

(51) Int. Cl.
G02C 7/06 (2006.01)
(52) U.S. Cl.
USPC ............. 351/159.42; 351/159.06; 351/159.74
(58) Field of Classification Search
CPC ...... G02C 7/0024; G02C 7/025; G02C 7/027; G02C 7/028; G02C 7/041; G02C 7/06; G02C 7/066
USPC ............ 351/159.06, 159.42, 159.73–159.77
See application file for complete search history.

(56) References Cited

U.S. PATENT DOCUMENTS

| | | | |
|---|---|---|---|
| 5,270,745 A | 12/1993 | Pedrono et al. | 351/169 |
| 5,710,615 A | 1/1998 | Kitani | 351/169 |
| 5,861,935 A | 1/1999 | Morris et al. | |
| 6,652,096 B1 | 11/2003 | Morris et al. | |
| 7,740,358 B2 | 6/2010 | Pedrono et al. | 351/246 |
| 2011/0013137 A1* | 1/2011 | Kitani | 351/169 |
| 2011/0317127 A1* | 12/2011 | Suzuki et al. | 351/169 |

FOREIGN PATENT DOCUMENTS

| | | |
|---|---|---|
| GB | 2261527 A | 5/1993 |
| JP | 08-238222 | 9/1996 |
| JP | 08-286156 | 11/1996 |
| JP | 09-179074 | 7/1997 |
| JP | 2003-329984 | 11/2003 |
| JP | 2008-511033 | 4/2008 |
| JP | 2010-104754 | 5/2010 |
| WO | 9738343 A1 | 10/1997 |
| WO | 0073846 A1 | 12/2000 |

OTHER PUBLICATIONS

Extended European search report dated Jan. 31, 2012 issued in corresponding European application 11187833.6 cites the foreign patents above.

* cited by examiner

Primary Examiner — Darryl J Collins
(74) Attorney, Agent, or Firm — DLA Piper LLP (US)

(57) ABSTRACT

A progressive power lens including a distance portion for visual recognition of a far working distance, a near portion for visual recognition of a near working distance, and an intermediate portion provided between the distance portion and the near portion, the intermediate portion including a position of an amount of intermediate inset in which a visual line when the intermediate working distance is visually recognized passes an eyeball side surface of the progressive power lens, and addition at intermediate position for viewing an intermediate working distance smaller than the far working distance and larger than the near working distance being set to the position of the amount of intermediate inset.

5 Claims, 7 Drawing Sheets

PROGRESSIVE POWER LENS AND PROGRESSIVE POWER LENS DESIGN METHOD

This application claims priority to Japanese Patent Application No. 2010-249450, filed Nov. 8, 2010, the entirety of which is hereby incorporated by reference.

BACKGROUND

1. Technical Field

The present invention relates to a progressive power lens having a distance portion for visual recognition of a far working distance, a near portion for visual recognition of a near working distance, and an intermediate portion provided between the distance portion and the near portion, and a design method thereof.

2. Related Art

Eyeglass lenses include progressive power lenses in addition to single focus eyeglass lenses.

As shown in FIG. 7A, as the progressive power lens, there is an aspherical lens having a distance portion 1, a near portion 2, an intermediate portion 3 provided between the distance portion 1 and the near portion 2, and intermediate side portions 4 provided on both sides of the intermediate portion 3.

A principal meridian (main meridian) A is set over the distance portion 1, the progressive portion 3, and the near portion 2. The principal meridian A is provided vertically nearly in the center part in the distance portion 1, provided to be inclined toward the nose side in the intermediate portion 3, and provided to extend vertically in the near portion 2. In the near portion 2, the principal meridian A is deviated toward the nose side by convergence near point at close-range observation.

A part between a start point of progressive power S and a end point of progressive power E of the principal meridian A is a progressive surface on which addition continuously changes. A vertical length between the start point of progressive power S and the end point of progressive power E is a length of progressive zone and a length along the horizontal direction orthogonal to the vertical direction is an amount of inset I.

As shown in FIG. 7B, the power (dioptric power) of the lens on the principal meridian A is a power D1 from the distance portion 1 to the start point of progressive power S, increases from the power D1 to a power D2 from the start point of progressive power S to the end point of progressive power E, and is the power D2 from the end point of progressive power E to the lower part of the near portion 2.

Further, as a design method of a progressive power lens in related art, there are a method of designing a pair of progressive power eyeglass lenses by obtaining an amount of deviation of a sagittal plane, assuming a position of near vision, and shifting meridians from far vision to near vision according to the determined near vision (Patent Document 1 (JP-T-2008-511033), a method of changing a position of a principal meridian located in an intermediate vision distance section and a close vision distance section for designing a progressive power lens in consideration of changes (decreases) of the close vision distance caused with age (Patent Document 2 (JP-A-9-179074)), and further, a method of designing progressive multifocal lens by providing a far vision power measurement position in an upper position of a geometric center of the lens, providing an eye point in the horizontal direction of the geometric center of the lens, providing a near vision power measurement position in a position lower than a geometric center and inner at the nose side of the lens, and providing a principal line of fixation passing through the three positions and dividing the lens into a nose side part and an ear side part (Patent Document 3 (JP-A-8-286156).

In the example shown in FIGS. 7A and 7B, the position of the principal meridian A changes from the start point of progressive power S to the end point of progressive power E by the amount of inset I, and the power of the lens on the principal meridian A is the power D1 from the distance portion 1 to the start point of progressive power S and the power D2 from the end point of progressive power E to the lower part of the near portion 2. The position of the principal meridian A is connected to the start point of progressive power S and the end point of progressive power E as the region of the intermediate portion 3 simply by a straight line, and accordingly, the power of the lens on the principal meridian A only simply changes from the power D1 to the power D2 from the start point of progressive power S to the end point of progressive power E.

That is, in related art, the intermediate portion 3 is not regarded as a region for positive visual recognition, and the amount of inset within the region is not positively considered in the lens design, and there is a problem that feeling of wearing is not satisfactory.

The related art example shown in Patent Document 1 is for setting the optimal meridians (principal meridians) on right and left lenses in consideration of the deviation of the sagittal surface in near vision of a wearer relative to a standard sagittal surface, but not for lens design in consideration of the amount of inset in a region between the far vision region and the near vision region, and thus, the example has the same problem as that of the example in FIGS. 7A and 7B.

The related art example shown in Patent Document 2 is to change the position of the principal meridian located in the intermediate vision distance section and the close vision section, but not in consideration of the intermediate section adjacent to the sections in lens design, and thus, the example has the same problem as that of the example in FIGS. 7A and 7B.

The related art example shown in Patent Document 3 is, for bringing the horizontal arrangement of three points of the far vision power measurement position, the eye point position, and the near vision power measurement position to respond to convergence near point action of eyes for near vision for both right eye and left eye, to locate the eye point position nearer the nose side than the far vision power measurement position and locate the eye point position even nearer the nose side than the near vision power measurement position, and use one curve passing through the three positions as a principal line of fixation. However, the curve is for making the two surface parts divided by the principal line of fixation asymmetric in the horizontal direction with the principal line of fixation in between, but the intermediate region is not focused on. Thus, the example has the same problem as that of the example in FIGS. 7A and 7B.

SUMMARY

An advantage of some aspects of the invention is to provide a progressive power lens with good feeling of wearing and a progressive power lens design method.

An aspect of the invention is directed to a progressive power lens including a distance portion for visual recognition of a far working distance, a near portion for visual recognition of a near working distance, and an intermediate portion provided between the distance portion and the near portion, the intermediate portion including a position of an amount of intermediate inset in which a visual line when an intermediate working distance is visually recognized passes an eyeball side surface of the progressive power lens, the intermediate working distance being smaller than the far working distance and larger than the near working distance, and addition at intermediate position for viewing the intermediate working distance being set to the position of the amount of intermediate inset.

In the aspect of the invention having the configuration, the addition at intermediate position necessary for viewing the intermediate working distance is provided to the position of the amount of intermediate inset set based on an intermediate pupillary distance in addition to the refractive power respectively set for the distance portion and the near portion, and thus, aberration is not caused in a field of view for visible recognition through the intermediate portion and feeling of wearing is good. In the aspect of the invention, the far working distance includes an infinite distance.

Here, in the aspect of the invention, it is preferable that, given that an intermediate pupillary distance as a distance between the position of the amount of intermediate inset for left eye and the position of the amount of intermediate inset for right eye is MPD and a far vision pupillary distance when the far working distance is visually recognized is OPD, the amount of intermediate inset ML is obtained from ML=(OPD−MPD)÷2.

In the aspect of the invention having the configuration, the far vision pupillary distance OPD that is often obtained for lens design is used for computation of the amount of intermediate inset ML, and thus, the lens design may be performed efficiently.

Further, given that a necessary amplitude of accommodation is F, the intermediate working distance is ml, and refractive power in an resting position of accommodation showing an adjustment state under physiological tension without adjustment or stimulation is mf, the addition at intermediate position MF is obtained from MF=F−mf=(1/ml)−mf.

In the aspect of the invention having the configuration, the addition at intermediate position MF is obtained by subtracting the refractive power mf in the resting position of accommodation from the inverse number (1/ml) of the intermediate working distance ml. The resting position of accommodation shows an adjustment state that the eyes at rest are unconsciously focused for viewing something under physiological tension without adjustment or stimulation of convergence near point, and the addition at intermediate position MF is set on the assumption of the resting position of accommodation. Thus, parasympathetic nerves are not mediated for view of the intermediate working distance ml, and the progressive power lens with less feeling of fatigue may be designed.

Another aspect of the invention is directed to a progressive power lens design method including obtaining an intermediate pupillary distance; setting an amount of intermediate inset based on the intermediate pupillary distance; and setting addition at intermediate position necessary for viewing an intermediate working distance in a set position of the amount of intermediate inset.

In the aspect of the invention having the configuration, at the step of obtaining the intermediate pupillary distance, for example, an object such as a personal computer or a television display provided at an intermediate working distance from 50 cm to 100 cm, and the distance from the object to the wearer is used as the intermediate working distance. Then, the intermediate pupillary distance MPD for the intermediate working distance is directly obtained by an instrument. After the step, the amount of intermediate inset ML is obtained based on the intermediate pupillary distance MPD by computation, and then, the addition at intermediate position necessary for viewing the intermediate working distance in the position of the amount of intermediate inset ML is set.

Accordingly, in the aspect of the invention, a method of rationally designing a progressive power lens with good feeling of wearing may be provided.

Here, in the progressive power lens design method according to the aspect of the invention, it is preferable that, given that a direction defining the amount of intermediate inset is x, a direction orthogonal to the direction x is y, and the origin O of the direction x and the direction y is a start point of progressive power set in the distance portion, a position in the y direction for setting the addition at intermediate position is obtained from a relationship between average power changes set for the start point of progressive power and a end point of progressive power set in the near portion and positions of the start point of progressive power and the end point of progressive power.

In the aspect of the invention having the configuration, the position in the x direction (coordinates) of the addition at intermediate position is obtained in the above described procedure and the position in the y direction (coordinates) of the addition at intermediate position is obtained from the relationship between average power changes set for the start point of progressive power and the endpoint of progressive power and positions of the start point of progressive power and the endpoint of progressive power. That is, from the graph of the average power changes, the position on the y-coordinates corresponding to the position of the addition at intermediate position on the x-coordinates is obtained, and the y-coordinate position is used as the set position on the y-coordinates of the addition at intermediate position. Accordingly, in the aspect of the invention, a lens without aberration in a field of view but with better feeling of wearing may be designed by a simple method.

BRIEF DESCRIPTION OF THE DRAWINGS

The invention will be described with reference to the accompanying drawings, wherein like numbers reference like elements.

FIG. 1A is a front view and FIG. 1B is a graph showing a relationship between an average power change and a position of a principal meridian.

FIG. 7A is a front view and FIG. 7B is a graph showing a relationship between an average power change and a position of a principal meridian.

DESCRIPTION OF EXEMPLARY EMBODIMENTS

An embodiment of the invention will be explained according to the drawings.

Figures 1A, 1B:
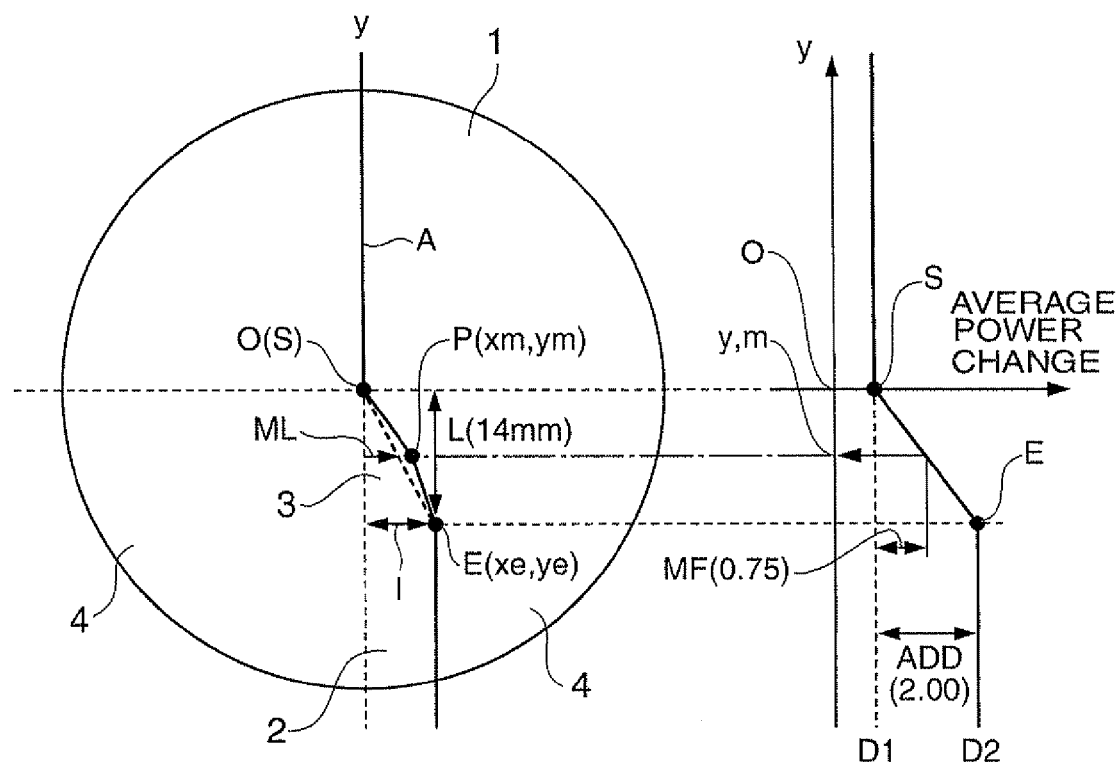
FIGS. 1A and 1B show a progressive power lens according to an embodiment of the invention.

FIGS. 1A and 1B show a progressive power lens according to an embodiment of the invention.

As shown in FIG. 1A, the progressive power lens of the embodiment is an aspherical lens having a distance portion 1 for visual recognition of a far working distance including an infinite distance, a near portion 2 for visual recognition of a near working distance, an intermediate portion 3 provided between the distance portion 1 and the near portion 2, and intermediate side portions 4 provided on both sides of the intermediate portion 3.

A principal meridian A with which a visual line is in contact is set over the distance portion 1, the progressive portion 3, and the near portion 2. The principal meridian A is located in a position on the lens in which visual lines frequently pass at wearing, provided vertically nearly in the center part in the distance portion 1, and provided to extend vertically in the near portion 2. In the near portion 2, the principal meridian A is deviated toward the nose side by convergence near point at close-range observation.

A part between a start point of progressive power S and a end point of progressive power E of the principal meridian A is a progressive surface on which addition continuously changes. The vertical length between the start point of progressive power S and the end point of progressive power E is a length of progressive zone L and a length along the horizontal direction orthogonal to the vertical direction is an amount of inset I.

With a fitting point as origin O, a direction passing through the origin O and along the principal meridian A of the distance portion 1 is y-coordinates and a direction passing through the origin O and orthogonal to the y-coordinates is x-coordinates. The origin O is the start point of progressive power S and its coordinates are (0,0). The coordinates of the end point of, progressive power E are (xe,ye) (0<xe).

As shown in FIG. 1B, on the principal meridian A, the power is a power D1 from the distance portion 1 to the start point of progressive power S, increases from the power D1 to a power D2 from the start point of progressive power S to the end point of progressive power E, and is the power D2 from the end point of progressive power E to the lower part of the near portion 2. Addition ADD in the embodiment is ADD=D2−D1.

The amount of inset I will be explained according to FIG. 2.

Figure 2:
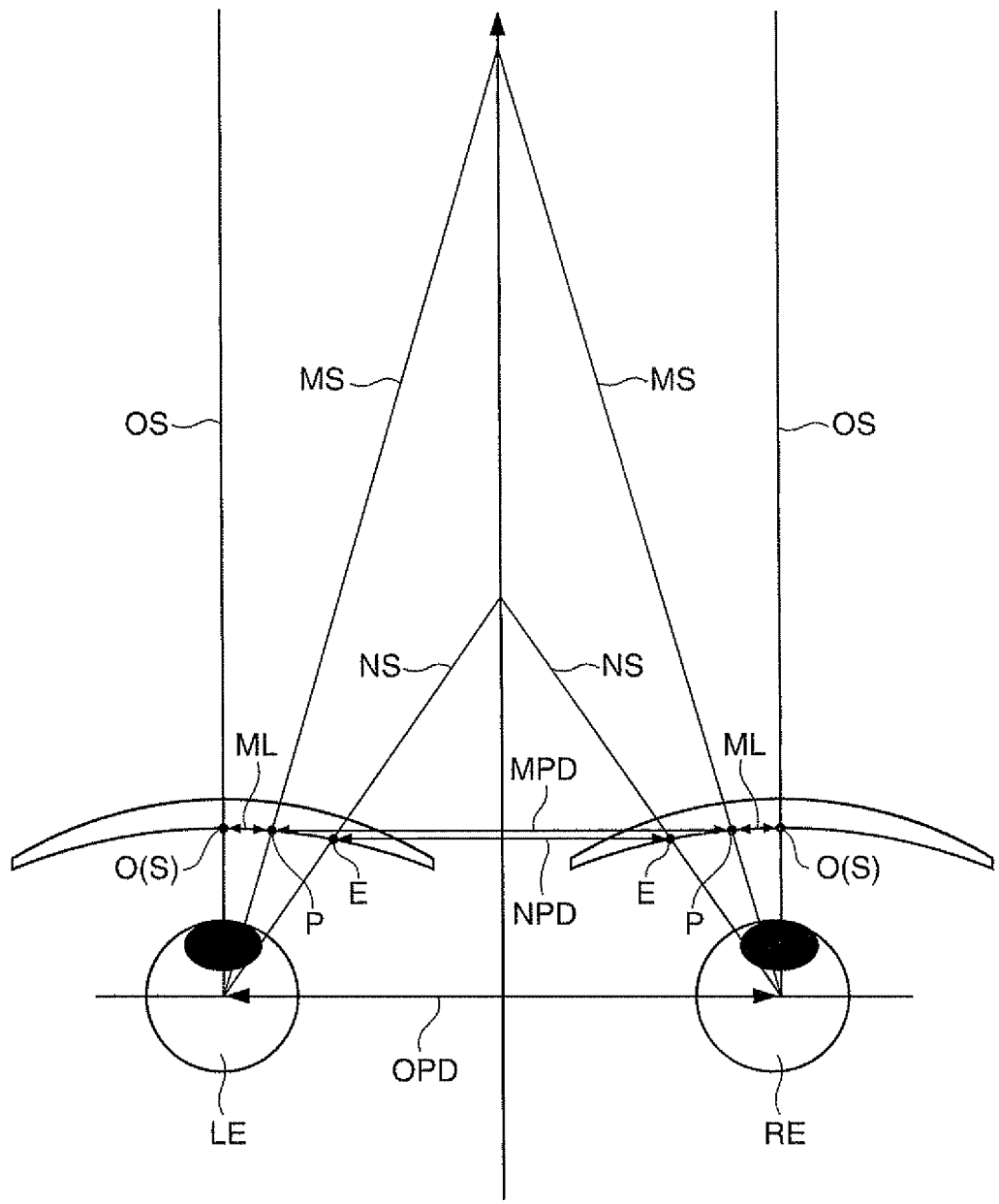
FIG. 2 is a schematic diagram for explanation of a far vision pupillary distance, a near vision pupillary distance, and an intermediate vision pupillary distance.

FIG. 2 is a schematic diagram for explanation of a far vision pupillary distance, a near vision pupillary distance, and an intermediate vision pupillary distance.

In FIG. 2, generally, visual lines when a left eye LE and a right eye RE view an infinite distance are OS, and x-coordinate positions in which the visual lines are transmitted through the eyeball side surfaces of the progressive power lenses are the same O as the positions of the start point of progressive powers S. In this regard, the distance between the start point of progressive powers S of the right and left progressive power lenses is a distance between a rotation center of the left eye LE and a rotation center of the right eye RE, and the distance is a far vision pupillary distance OPD. On the other hand, visual lines when the eyes view a near working distance (generally, 30 to 40 cm) are NS, and x-coordinate positions in which the visual lines NS are transmitted through the eyeball side surfaces of the progressive power lenses are the same as the positions of the end point of progressive powers E, and the distance between the end point of progressive powers E of the right and left progressive power lenses is a near vision pupillary distance NPD.

The amount of inset I is obtained by I=(OPD−NPD)÷2.

In the embodiment, in the intermediate portion 3, an amount of intermediate inset ML is set.

Visual lines when the eyes view an intermediate working distance ml (generally, ml=50 to 100 cm) are MS, and, in the right and left progressive power lenses, the distance between x-coordinate positions in which the visual lines MS are transmitted through the eyeball side surfaces of the progressive power lenses is an intermediate pupillary distance MPD.

The amount of intermediate inset ML is obtained by ML=(OPD−MPD)÷2.

In FIG. 1A, a set position P of the amount of intermediate inset ML is located in (xm,ym) (0<xm). In the set position P, addition at intermediate position MF is set.

Given that a necessary amplitude of accommodation is F, the intermediate working distance is ml, and refractive power in an resting position of accommodation showing an adjustment state under physiological tension without adjustment or stimulation is mf, the addition at intermediate position MF is obtained from $$MF = F - mf = (1/ml) - mf.$$

Figure 3:
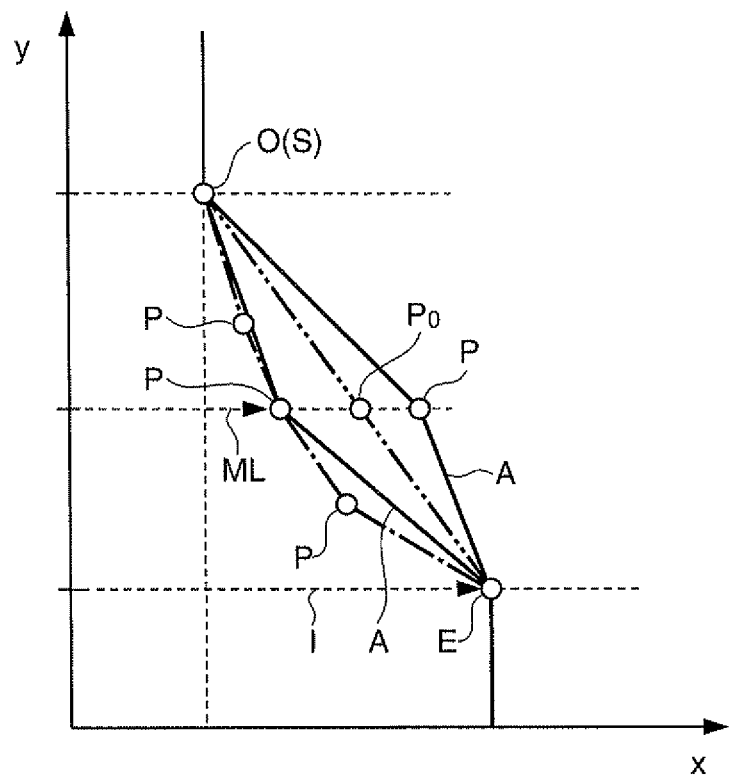
FIG. 3 is a graph for explanation of an outline of an amount of intermediate inset, and a horizontal axis indicates a lateral position of the lens and a vertical axis indicates a longitudinal position.

FIG. 3 is a conceptual diagram for explanation of the amount of intermediate inset ML.

A solid line in FIG. 3 shows an example in which one amount of intermediate inset ML is set in the intermediate portion 3. The position P in which the one amount of intermediate inset ML is set and the start point of progressive power S are connected by a straight line and the position P and the end point of progressive power E are connected by a straight line, and these straight lines form a principal meridian. As will be described later, the position of the amount of intermediate inset ML changes depending on various conditions, and is set to an inner position or an outer position relative to the set position Po of the amount of inset in related art shown by a double-dashed line in FIG. 3. Note that the setting of the amount of intermediate inset ML is not limited to one location, but may be, for example, plural locations, i.e., three locations. In this case, the principal meridian is as shown by a dashed line in FIG. 3.

Next, the first embodiment according to a design method of the progressive power lens according to the invention will be explained.

Measurement Step of Parameters of Wearer

A far vision pupillary distance OPD, a near vision pupillary distance NPD, and an intermediate pupillary distance MPD of a wearer are measured.

In measurement of the distances, for example, under a condition that the wearer wears progressive power lenses, positions of eyes on the right and left progressive power lenses when the wearer views a far distance or a near distance may be respectively marked and a distance of the straight line connecting the marked positions may be used as the far vision pupillary distance OPD or the near vision pupillary distance NPD. Or, under a condition that the wearer wears single focus lenses for optometry for near vision and far vision, positions of eyes on the right and left single focus lenses when the wearer views a far distance or a near distance may be respectively marked and a distance of the straight line connecting the marked positions may be used as the far vision pupillary distance OPD or the near vision pupillary distance NPD. Or, a distance between rotation centers of right and left eyeballs of the wearer may be measured by a measurement machine, the distance between the rotation centers may be used as the far vision pupillary distance OPD, and further, distances between surfaces at the eyeball side of the progressive power lenses and the eyeballs may be measured or set to known values, and the near vision pupillary distance NPD may be obtained by trigonometric functions from a near working distance when the wearer views a near distance and the value of the distance between the rotation centers of the right and left eyeballs.

Then, for measurement of the intermediate pupillary distance MPD, first, an object such as a personal computer or a television display provided in a position at an intermediate working distance ml, e.g., 80 cm is set as a target value. In this regard, the measurement of the intermediate pupillary distance MPD may be performed in the same manner as the measurement of the near vision pupillary distance NPD. For example, the distances between the surfaces at the eyeball side of the progressive power lenses and the eyeballs may be computed or set to known values, and the intermediate pupillary distance MPD may be obtained by trigonometric functions from the intermediate working distance ml and the value of the distance between the rotation centers of the right and left eyeballs.

Further, refractive power mf in an resting position of accommodation is measured. The resting position of accommodation shows an adjustment state under physiological tension without adjustment or stimulation of convergence near point, and the refractive power mf in the state is measured using an optometric instrument (Accommodometer AA-2000 (manufactured by NIDEC), Auto refractometer GR-2100/GR-3100K (manufactured by Grand Seiko)).

Note that, in the case where precise measurement is difficult, an accurate resting position of accommodation is not obtained, but a numeric value from 0.50 to 1.00 (D) may be used for convenience.

Then, in the same manner as that in related art, a length of progressive zone L, powers D1, D2, and addition ADD are determined, and further, a start point of progressive power S, a end point of progressive power E, and an amount of inset I are obtained.

Amount of Intermediate Inset Setting Step

The amount of intermediate inset ML is set based on the intermediate pupillary distance MPD obtained at the above described step.

Here, the amount of intermediate inset ML is obtained from the equation of ML=(OPD−MPD)÷2.

Addition at Intermediate Position Setting Step

The addition at intermediate position MF necessary for viewing the intermediate working distance ml in the set position P of the amount of intermediate inset is set.

The addition at intermediate position MF set in the set position P of the amount of intermediate inset ML is obtained from the following equation.

Given that a necessary amplitude of accommodation is F, the intermediate working distance is ml, and refractive power in the resting position of accommodation is mf, the addition at intermediate position MF is obtained from the equation of $$MF=F-mf=(1/ml)-mf$$

as described above.

Here, the intermediate working distance ml is a predetermined value as described above and the refractive power mf in the resting position of accommodation is measured using the measurement machine as described above, and thus, the addition at intermediate position MF may be computed.

For example, if the intermediate working distance ml is 0.8 m and the necessary amplitude of accommodation F is (1/ml), the amount is 1.25 (D). If the measurement value of the refractive power in the resting position of accommodation mf is 0.5 (D), the addition at intermediate position MF is 0.75 (D).

The amount of intermediate inset ML is a distance of the set point P on x-coordinates, and the position on the y-coordinates is obtained from a graph showing the relationship between the average power changes set for the start point of progressive power S and the end point of progressive power E and the positions of the start point of progressive power S and the end point of progressive power E in FIG. 1E.

Figure 4:
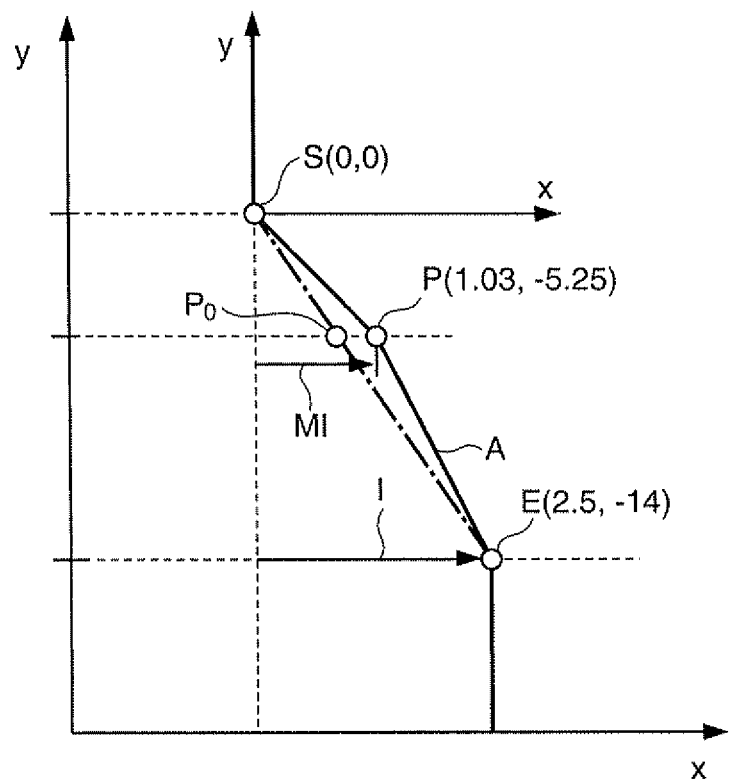
FIG. 4 is a graph showing a position in which addition at intermediate position is set in the embodiment.

As a result of the above described measurement, given that the far vision pupillary distance OPD is 66.00 mm, the near vision pupillary distance NPD is 61.00 mm, the intermediate pupillary distance MPD is 63.94 mm, the addition ADD of the progressive power lens is 2.00 (D), and the length of progressive zone L is 14 mm, the amount of inset I is 2.50 mm and the amount of intermediate inset ML is ML=(66.00 mm−63.94 mm)÷2=1.03 mm. Further, the addition at intermediate position MF is 0.75 (D), and, regarding the set position P, as shown in FIG. 4, the y-coordinate is 5.25 mm below the origin O and the x-coordinate is 1.03 mm to the right from the origin O (xm=1.03 mm, ym=−5.25 mm).

Therefore, in the embodiment, the following effects may be exerted.

(1) The addition at intermediate position MF necessary for viewing the intermediate working distance ml is provided to the set position P of the amount of intermediate inset ML set based on the intermediate pupillary distance MPD in addition to the refractive power respectively set for the distance portion 1 and the near portion 2, and thus, aberration is not caused on the principal meridian for visible recognition through the intermediate portion 3 and the feeling of wearing is good.

(2) The amount of intermediate inset ML is obtained from ML=(OPD−MPD)÷2, given that the intermediate pupillary distance is MPD and the far vision pupillary distance for visible recognition of the far working distance is OPD, and the far vision pupillary distance OPD that is often obtained for lens design is used for computation of the amount of intermediate inset ML, and thus, the lens design may be performed efficiently.

(3) The addition at intermediate position MF is obtained from the equation of MF=F−mf=(1/ml)−mf, given that the necessary amplitude of accommodation is F, the intermediate working distance is ml, and refractive power in the resting position of accommodation is mf. That is, the addition at intermediate position MF is set on the assumption of the resting position of accommodation, and thus, parasympathetic nerves are not mediated for view of the intermediate working distance ml, and the progressive power lens with less feeling of fatigue may be designed.

(4) The y-coordinate of the set position P for setting the addition at intermediate position MF is obtained from the graph of the relationship between the average power changes between the start point of progressive power S and the end point of progressive power E and the positions of the start point of progressive power S, the end point of progressive power E, and the principal meridian A. That is, from the graph of the average power changes and the position of the principal meridian A, the position on the y-coordinates corresponding to the set position P of the addition at intermediate position MF on the x-coordinates is obtained and the y-coordinate position is used as the position on y-coordinates for setting the amount of intermediate inset ML, and thus, a lens with good feeling of wearing may be designed by a simple method.

Next, the second embodiment according to the design method of the progressive power lens according to the invention will be explained according to FIGS. 5 and 6. The progressive power lens of the second embodiment is the same as the lens of the first embodiment.

In the second embodiment, the position for setting the amount of intermediate inset ML is specified by a measurement machine, and the rest of the configuration is the same as that of the first embodiment.

As a measurement method, an eye mark recorder is used. The eye mark recorder measures visual line directions of a person to be measured and may measure an object distance from the visual line directions of both eyes at the same time. From a measurement result, the positions on the lenses in which the visual lines pass and the object distance are obtained. In the longitudinal positions of the lenses in which the visual lines pass, amounts of inset and addition at intermediate position suitable for the object distance are set, and thus, lens design appropriate for a wearer is made.

In the second embodiment, a known instrument is used for the eye mark recorder. For example, eye mark recorders to which technologies disclosed in JP-A-8-238222 and JP-A-2010-104754 are applied, and further, a mobile eye mark recorder EMR-9 (manufactured by nac Image Technology) may be used. The technology disclosed in JP-A-8-238222 is to apply light to an eyeball as a target of visual line recognition for imaging an image having plural feature points on a cornea of the eyeball, obtain a center of curvature of the cornea from the feature points of the image imaged on the cornea, and recognize a visual line direction from the center of curvature of the cornea and position information of a pupil center. In this case, when a tentative visual line computing unit computes a tentative visual line direction from the center of curvature of the cornea and the position information of the pupil center, a cornea region determining unit obtains a limited cornea region from the tentative visual line direction and the position information of the pupil. Then, if there are the feature points of the image within the limited cornea region, a processing unit determines the tentative visual line direction as a visual line recognition result and, if there is no feature point of the image within the limited cornea region, selects the feature points of the image existing within the limited cornea region, obtains the center of curvature of the cornea of the eyeball from the selected feature points of the image, recognizes the visual line direction from the center of curvature of the cornea and the position information of the pupil center, and determines it as a visual line recognition result.

In the second embodiment, there are two measurement methods of the eye mark recorder, and they will be explained using FIGS. 5 and 6.

Figure 5:
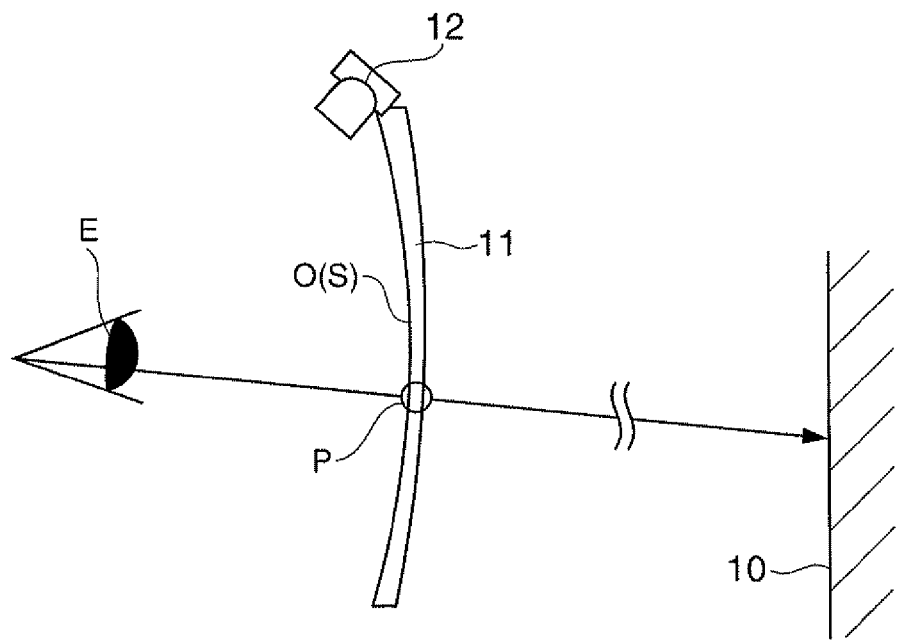
FIG. 5 is a schematic diagram for explanation of a method of directly measuring a visual line using an eye mark recorder.

In FIG. 5, a wall 10 located in a position at an intermediate working distance, for example, at 100 cm from eyes is set as a target. Note that an environment in which the visual line does not move out of the length of progressive zone is provided. Then, an eye mark recorder 12 is set to be directed from above a lens 11 toward an eye RE (LE) of a wearer. The lens 11 that the wearer wears is a single focus lens. A progressive power lens is not used because the wearer views only an easily viewable position with the progressive power lens and measurement is not accurately performed.

Next, the wearer wears the lens 11 and measurement using the eye mark recorder 12 is performed.

The wearer is asked to direct the visual line to the placed object (wall), and which part of the lens 11 is used is measured. The longitudinal position on the lens 11 in which the visual line passes when the wearer views the intermediate working distance (100 cm) is measured by the eye mark recorder 12. That is, when the wearer views the object at 100 cm ahead, at how many millimeters below the fitting point (start point of progressive power S) of the lens 11 is used is measured by the eye mark recorder 12. The measurement value in the embodiment is 4 mm below the fitting point FP (y=0).

Further, as is the case of the first embodiment, an amount of intermediate inset ML is obtained from premeasured intermediate pupillary distance MPD and far vision pupillary distance OPD, and the above described measurement value is set to the set position of the amount of intermediate inset ML.

Then, addition at 4 mm below the fitting point FP is set to addition for ease of view. That is, under the condition of the resting position of accommodation, the addition at intermediate position MF is adjusted so that the wearer may view the distance at 100 cm. Given that the necessary addition is 1.00 (D) and the refractive power mf in the resting position of accommodation is 0.5 (D), the addition at intermediate position MF is MF=F−mf=(1/ml)−mf=0.5 (D).

Furthermore, a principal meridian A in which the amount of intermediate inset ML at the intermediate working distance of 100 cm and the addition at intermediate position MF designed in positions for ease of view of the wearer is set.

Figure 6:
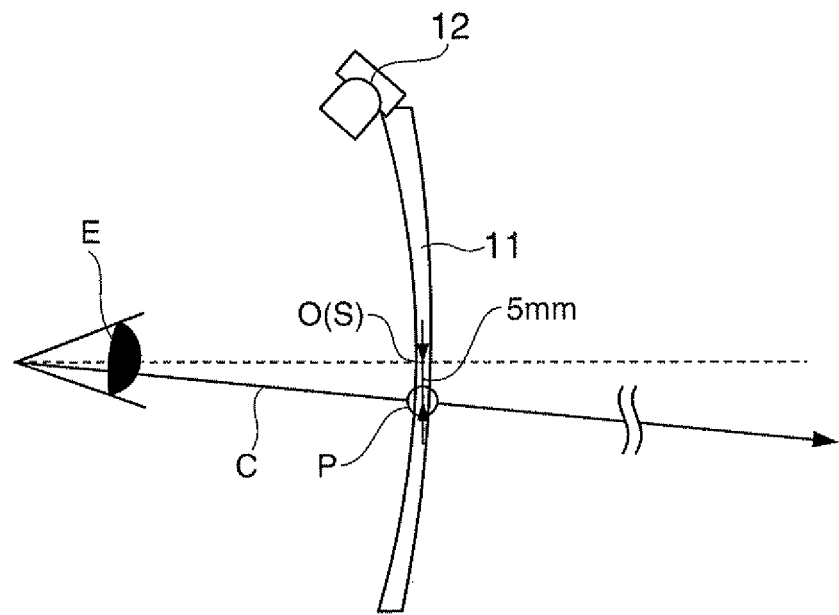
FIG. 6 is a schematic diagram for explanation of a method of directly measuring the visual line using the eye mark recorder.
Figures 7A, 7B:
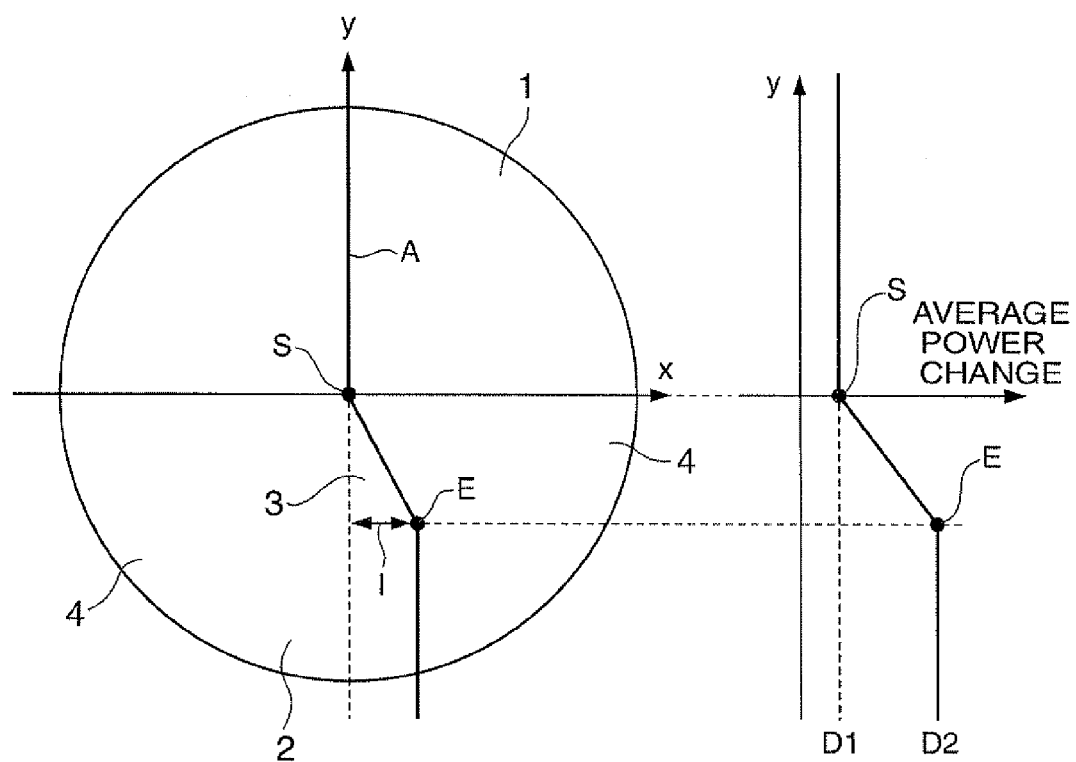
FIGS. 7A and 7B show a progressive power lens in related art.

In FIG. 6, the eye mark recorder 12 is set to be directed from above the lens 11 toward an eye RE (LE) of a wearer. The example in FIG. 6 is different from the example in FIG. 5 in that no wall is provided.

First, visual line directions C of both eyes are measured by the eye mark recorder 12. Then, the wearer wears the single focus lenses 11 and measurement of the eye mark recorder 12 is performed.

The positions on the lenses in which the visual lines pass are determined. In the embodiment, where the visual line passing at 5 mm below the fitting point FP views is measured.

Further, an object distance is measured by the visual line directions C of the eyes. The object distance is in the position where an intersection of the visual lines of the eyes visually recognizes. In the example of FIG. 6, it is known that the visual lines are easily concentrated on the object at 100 cm when the part at 5 mm below the fitting point FP is used.

Further, the intermediate pupillary distance MPD when the wearer views the intermediate working distance ml of 100 cm is measured, and addition necessary for the wearer for view of the intermediate working distance ml of 100 cm is obtained in the same manner as that in the example of FIG. 5. That is, given that the necessary addition is 1.00 (D) and the refractive power mf in the resting position of accommodation is 0.5 (D), the addition at intermediate position MF is MF=F−mf=(1/ml)−mf=0.5 (D).

Furthermore, as is the case of the example in FIG. 5, a principal meridian A in which the amount of intermediate inset ML at the intermediate working distance of 100 cm and the addition at intermediate position MF designed in positions for ease of view of the wearer is set.

Therefore, in the second embodiment, the following effect may be exerted in addition to the effects (1) to (3) of the first embodiments.

(5) Which part of the lens the wearer uses and how far the wearer views are measured by the eye mark recorder 12 and an optimal lens for the wearer is designed based on the measurement data, and thus, the lens with good feeling of wearing in response to the wearer may be designed.

Note that the invention is not limited to the above described embodiments, and it is obvious that the invention contains modifications and improvements within the range in which the purpose and effects of the invention can be achieved.

For example, in the embodiments, the amount of intermediate inset ML has been obtained based on the difference between the far vision pupillary distance OPD and the intermediate pupillary distance MPD, however, in the invention, it may be obtained based on the difference between the near vision pupillary distance NPD and the intermediate pupillary distance MPD.

Further, in the embodiments, the designer has determined the intermediate working distance ml used by the wearer, however, otherwise, by hearing the intermediate working distance ml frequently used by the wearer in practice and which position of the lens particularly used by the wearer and designating the intermediate working distance ml and increasing the intermediate working distance ml to be measured, a lens more easily used by the wearer may be designed than in the design according to the embodiments.

Furthermore, in the embodiments, the refractive power mf in the resting position of accommodation has been used for lens design, however, if reflective power (adjustment power) for the wearer to easily use for viewing the intermediate working distance ml is known, the value may be used.

In addition, the invention may be applied to a progressive power lens on which the fitting point and the start point of progressive power S are not in the same position.

The invention may be used for a progressive power lens having a distance portion, a near portion, and an intermediate portion.

What is claimed is:

1. A progressive power lens comprising:
   a distance portion for visual recognition of a far working distance,
   a near portion for visual recognition of a near working distance, and
   an intermediate portion provided between the distance portion and the near portion,
   wherein an addition of the intermediate portion that is required for viewing an intermediate working distance, which is smaller than the far working distance and larger than the near working distance, is set at a position of an intermediate inset where a line of sight intersects an eyeball side surface of the progressive lens when viewing the intermediate working distance.

2. The progressive power lens according to claim 1, wherein, given that
   an intermediate vision pupillary distance as a distance between the position of the intermediate inset for left eye and the position of the intermediate inset for right eye is MPD and a far vision pupillary distance when the far working distance is visually recognized is OPD, an amount of the intermediate inset ML is obtained from the following formula
   $$ML=(OPD-MPD)\div 2.$$

3. The progressive power lens according to claim 1, wherein, given that
   a necessary amplitude of accommodation is F, the intermediate working distance is ml, and refractive power in a resting position of accommodation showing an adjustment state under physiological tension without adjustment or stimulation is mf, the addition at the intermediate portion MF is obtained from the following formula
   $$MF=F-mf=(1/ml)-mf.$$

4. A progressive power lens design method for desinging the progressive power lens according to claim 1, comprising:
   obtaining an intermediate vision pupillary distance;
   setting an amount of the intermediate inset based on the intermediate vision pupillary distance; and
   setting the addition at the position of the intermediate inset in the intermediate portion for viewing the intermediate working distance.

5. The progressive power lens design method according to claim 4, wherein, given that a direction defining the amount of intermediate inset is x, a direction orthogonal to the direction x is y, and an intersection of the direction x and the direction y is a start point of progressive power set in the distance portion, a position in the y direction for setting the addition at the intermediate portion is obtained from a relationship between an average power change between the start point of progressive power and an endpoint of progressive power set in the near portion and positions of the start point of progressive power and the end point of progressive power.

* * * * *